(12) United States Patent
Wang et al.

(10) Patent No.: US 11,005,273 B2
(45) Date of Patent: May 11, 2021

(54) POWER MANAGEMENT CIRCUIT, INTELLIGENT TERMINAL, AND CHARGING METHOD

(71) Applicant: HUAWEI TECHNOLOGIES CO., LTD., Shenzhen (CN)

(72) Inventors: Ruimin Wang, Shenzhen (CN); Muyun Qin, Shenzhen (CN); Jianhui Jiang, Shenzhen (CN); Shaomin Qi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 15/756,985

(22) PCT Filed: Sep. 1, 2016

(86) PCT No.: PCT/CN2016/097828
§ 371 (c)(1),
(2) Date: Mar. 2, 2018

(87) PCT Pub. No.: WO2017/036413
PCT Pub. Date: Mar. 9, 2017

(65) Prior Publication Data
US 2018/0248387 A1     Aug. 30, 2018

(30) Foreign Application Priority Data

Sep. 2, 2015 (CN) .......................... 201510559299.9

(51) Int. Cl.
*H02J 7/00* (2006.01)
*H02J 7/34* (2006.01)

(52) U.S. Cl.
CPC .............. *H02J 7/0021* (2013.01); *H02J 7/00* (2013.01); *H02J 7/007* (2013.01); *H02J 7/0027* (2013.01); *H02J 7/342* (2020.01)

(58) Field of Classification Search
USPC .................................................. 320/103, 125
See application file for complete search history.

(56) References Cited

U.S. PATENT DOCUMENTS 5,721,481 A    2/1998  Narita et al.
6,452,362 B1 * 9/2002  Choo ........................ H02J 7/32
                                                      320/116
(Continued)

FOREIGN PATENT DOCUMENTS

CN       101388555 A     3/2009
CN       101789690 A     7/2010
(Continued)

*Primary Examiner* — Samuel Berhanu
(74) *Attorney, Agent, or Firm* — Kilpatrick Townsend & Stockton LLP

(57) ABSTRACT

The present disclosure relates to a power management circuit including a control circuit, a first switch module, a second switch module, and a voltage conversion circuit. A first input end of the control circuit receives a main battery activeness detection signal, a first output end is connected to an enabling end of the second switch module which is connected to the voltage conversion circuit and an energy recovery component, and a second output end is connected to an enabling end of the first switch module which is connected to the voltage conversion circuit, a secondary battery, and a main battery. According to the received activeness detection signal, a channel used by the energy recovery component to charge the secondary battery is connected, or a channel used by the secondary battery or the energy recovery component to charge the main battery is connected.

5 Claims, 6 Drawing Sheets

(56) References Cited

U.S. PATENT DOCUMENTS

| | | |
|---|---|---|
| 2008/0036417 A1 | 2/2008 | Toya et al. |
| 2011/0248683 A1 | 10/2011 | Young et al. |
| 2013/0069435 A1 | 3/2013 | Li et al. |

FOREIGN PATENT DOCUMENTS

| | | |
|---|---|---|
| CN | 101867198 A | 10/2010 |
| CN | 101997327 A | 3/2011 |
| CN | 103227502 A | 7/2013 |
| JP | 2000324719 A | 11/2000 |

* cited by examiner

POWER MANAGEMENT CIRCUIT, INTELLIGENT TERMINAL, AND CHARGING METHOD

CROSS-REFERENCE TO RELATED APPLICATIONS

This application is a national stage of International Application No. PCT/CN2016/097828, filed on Sep. 1, 2016, which claims priority to Chinese Patent Application No. 201510559299.9, filed on Sep. 2, 2015. Both of the aforementioned applications are hereby incorporated by reference in their entireties.

TECHNICAL FIELD

The present invention relates to the field of intelligent terminal technologies, and in particular, to a power management circuit, an intelligent terminal, and a charging method.

BACKGROUND

With a growing trend of wearable technologies, various wearable devices emerge on the market, and the wearable device usually includes two parts: a host and a wrist strap. Because of a function definition of some wearable devices, the host needs to be separable from the wrist strap. For example, in Huawei Talkband B1, to implement a Bluetooth headset function, a host needs to be separable from a wrist strap. That is, when the Bluetooth headset function is used, the host and the wrist strap are separated, and when a call is finished and a step count function is used, the host is connected to the wrist strap again. If a flexible film battery is deployed on the wrist strap of Talkband B1 to improve a battery capacity of the entire machine, a main battery on a host side may be frequently separated from the flexible battery on the wrist strap. For such a separable wearable device with dual batteries, how to ensure normal charging of the dual batteries is a technical problem to be resolved.

FIG. 1 is an architecture diagram of a power management chip in the prior art. In FIG. 1, a voltage conversion circuit is connected to an energy recovery component, a maximum power point tracking circuit, a switch SW, and a main battery, and is configured to convert a voltage output by the energy recovery component. A loop control circuit is connected to the switch SW and is configured to receive a valid signal or an invalid signal. Specifically, a valid signal is received when a host is in an active state, and an invalid signal is received when the host is in an inactive state. The valid signal may control the switch SW to be closed, and the invalid signal may control the switch SW to be opened. The switch SW is connected to the voltage conversion circuit, a secondary battery, and the main battery, a control end of the switch SW is connected to the loop control circuit, and the switch SW is configured to connect or disconnect a channel between the secondary battery and both the voltage conversion circuit and the main battery. In FIG. 1, when the host is in an active state, the loop control circuit receives a valid signal, and the valid signal controls the switch SW to be closed, so that the channel between the secondary battery and both the voltage conversion circuit and the main battery is connected, that is, output of the energy recovery component charges both the main battery and the secondary battery by using the voltage forwarding circuit, but cannot charge only the main battery.

It may be learned that the power management chip in the prior art cannot preferably charge the main battery when the host is in an active state, that is, cannot ensure normal charging of dual batteries.

SUMMARY

Embodiments of the present invention provide a power management circuit, an intelligent terminal, and a charging method, so that normal charging of dual batteries can be ensured.

According to a first aspect, a power management circuit is provided, where the power management circuit includes a control circuit, a first switch module, a second switch module, and a voltage conversion circuit;

the control circuit includes a first input end, a first output end, and a second output end, where the first input end is configured to receive a main battery activeness detection signal, the first output end is connected to an enabling end of the second switch module, and the second output end is connected to an enabling end of the first switch module;

the first switch module is connected to the voltage conversion circuit, a secondary battery, and a main battery;

the second switch module is connected to the voltage conversion circuit and an energy recovery component; and according to the received main battery activeness detection signal, the control circuit controls the first switch module to be closed or opened, and controls the second switch module not to input a signal, to input a valid signal, or to input an invalid signal, so that a channel used by the energy recovery component to charge the secondary battery is connected, or a channel used by the secondary battery or the energy recovery component to charge the main battery is connected.

With reference to the first aspect, in a first implementation of the first aspect, when the main battery activeness detection signal received by the control circuit is an invalid detection signal, the control circuit controls the first switch module to be closed and controls the enabling end of the second switch module not to input a signal; and when the enabling end of the second switch module does not input a signal, the second switch module is in a first state, a channel between the energy recovery component and the voltage conversion circuit is connected, and the voltage conversion circuit converts a voltage signal received from the energy recovery component and outputs the voltage signal to the secondary battery, so that the channel used by the energy recovery component to charge the secondary battery is connected.

With reference to the first aspect, in a second implementation of the first aspect, when the main battery activeness detection signal received by the control circuit is a valid detection signal, the control circuit controls the first switch module to be opened and controls the enabling end of the second switch module to input a valid signal; and when the enabling end of the second switch module inputs a valid signal, the second switch module is in a second state, a channel between the control circuit and the voltage conversion circuit is connected, and the voltage conversion circuit converts a voltage signal received from the secondary battery and outputs the voltage signal to the main battery, so that the channel used by the secondary battery to charge the main battery is connected.

With reference to the first aspect, in a third implementation of the first aspect, when the main battery activeness detection signal received by the control circuit is a valid detection signal, the control circuit controls the first switch module to be opened and controls the enabling end of the second switch module to input an invalid signal; and when the enabling end of the second switch module inputs an invalid signal, the second switch module is in a first state, a channel between the energy recovery component and the voltage conversion circuit is connected, and the voltage conversion circuit converts a voltage signal received from the energy recovery component and outputs the voltage signal to the main battery, so that the channel used by the energy recovery component to charge the main battery is connected.

With reference to the first aspect, in a fourth implementation of the first aspect, the control circuit further includes a third input end, a fourth input end, an inverter, a third switch module, and a comparator;

the third input end is configured to receive a preset voltage signal, and the fourth input end is configured to receive a voltage division signal of a voltage division circuit;

the inverter is connected to the first input end, an enabling end of the third switch module, and the second output end, and is configured to control the first switch module and the third switch module to be in opposite states;

the third switch module is connected to the first output end and an output end of the comparator, and the enabling end of the third switch module is connected to the inverter;

the comparator is connected to the third input end, the fourth input end, and the third switch module, and is configured to compare the received voltage division signal of the voltage division circuit with the received preset voltage signal;

when the inverter controls the third switch module to be in an open state, a channel between the enabling end of the second switch module and the output end of the comparator is disconnected, so that the enabling end of the second switch module is controlled not to input a signal;

when the inverter controls the third switch module to be in a closed state, a channel between the enabling end of the second switch module and the output end of the comparator is connected, so that the enabling end of the second switch module is controlled to input a signal; and when the enabling end of the second switch module inputs a signal, and when the comparator learns, by means of comparison, that the voltage division signal of the voltage division circuit is higher than the preset voltage signal, the comparator controls the first output end to output a valid signal, so as to control the enabling end of the second switch module to input the valid signal; or when the comparator learns, by means of comparison, that the voltage division signal of the voltage division circuit is not higher than the preset voltage signal, the comparator controls the first output end to output an invalid signal, so as to control the enabling end of the second switch module to input the invalid signal.

With reference to the fourth implementation of the first aspect, in a fifth implementation of the first aspect, the power management circuit further includes a maximum power point tracking circuit; and the maximum power point tracking circuit is connected to the output end of the comparator, and is configured to periodically configure a working voltage of the energy recovery component when receiving an enabling signal output by the comparator, so that the energy recovery component works at a maximum power output point, where the working voltage is configured by the maximum power point tracking circuit according to an open-circuit voltage of the energy recovery component and a preset algorithm.

According to a second aspect, an intelligent terminal is provided, where the intelligent terminal includes a host and a receptacle that can be separated from the host, the host includes a main battery and an activeness detection circuit, and the receptacle includes an energy recovery component, a secondary battery, and the power management circuit according to the first aspect; and the activeness detection circuit is connected to the first input end, and is configured to: detect whether the host is in an active state, and output a valid detection signal when detecting that the host is in an active state, or output an invalid detection signal when detecting that the host is in an inactive state.

With reference to the second aspect, in a first implementation of the second aspect, the activeness detection circuit includes a first resistor and a second resistor, and the first resistor and the second resistor are connected between a power end and a detection input end, where there are two leading wires between the first resistor and the second resistor, one leading wire is connected to a fifth output end, and the other leading wire is grounded by using a capacitor.

According to a third aspect, a charging method is provided, where the method includes:

receiving, by a first input end of a control circuit, a detection signal; and connecting, according to the main battery activeness detection signal, a channel used by an energy recovery component to charge a secondary battery, or connecting, according to the main battery activeness detection signal, a channel used by a secondary battery or an energy recovery component to charge a main battery.

With reference to the third aspect, in a first implementation of third aspect, the connecting, according to the main battery activeness detection signal, a channel used by an energy recovery component to charge a secondary battery includes:

when the received main battery activeness detection signal is an invalid detection signal, connecting the channel used by the energy recovery component to charge the secondary battery.

With reference to the third aspect, in a second implementation of third aspect, the connecting, according to the main battery activeness detection signal, a channel used by a secondary battery or an energy recovery component to charge a main battery includes:

when the received main battery activeness detection signal is a valid detection signal, connecting the channel used by the secondary battery or the energy recovery component to charge the main battery.

The embodiments of the present invention relate to the power management circuit, the intelligent terminal, and the charging method. The power management circuit includes the control circuit, the first switch module, the second switch module, and the voltage conversion circuit. The first input end of the control circuit receives the main battery activeness detection signal, the first output end is connected to the enabling end of the second switch module, and the second output end is connected to the enabling end of the first switch module. The first switch module is connected to the voltage conversion circuit, the secondary battery, and the main battery. The second switch module is connected to the voltage conversion circuit and the energy recovery component. According to the received main battery activeness detection signal, the control circuit controls the first switch module to be closed or opened, and controls the second switch module not to input a signal, to input a valid signal, or to input an invalid signal, so that the channel used by the energy recovery component to charge the secondary battery is connected, or the channel used by the secondary battery or the energy recovery component to charge the main battery is connected. In this way, normal charging of the dual batteries can be ensured.

DESCRIPTION OF EMBODIMENTS

The technical solutions of the present invention are further described in detail with reference to the accompanying drawings and embodiments as follows:

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the embodiments of the present invention, the following further describes the embodiments of the present invention in detail with reference to the accompanying drawings. The foregoing embodiments are not intended to limit the protection scope of the embodiments of the present invention.

To resolve a prior-art problem that normal charging of dual batteries cannot be ensured, the power management circuit provided in the embodiments of the present invention configures a priority of dual-battery charging. Specific configuration is as follows:

(1) When a host and a receptacle are not in a separated state, whether a secondary battery has electricity is determined first. If the secondary battery has electricity, the secondary battery is used to charge a main battery. If the secondary battery has no electricity, output of an energy recovery component is used to charge only the main battery and not to charge the secondary battery. This is because if the secondary battery is charged, the secondary battery needs to charge the main battery again. Two charging processes decrease end-to-end charging efficiency.

(2) When a host and a receptacle are in a separated state, output of an energy recovery component charges a secondary battery, to reserve energy.

A circuit management circuit that meets the foregoing priority configuration may be implemented by using solutions of Embodiment 1 and Embodiment 2 of the present invention.

Figure 1:
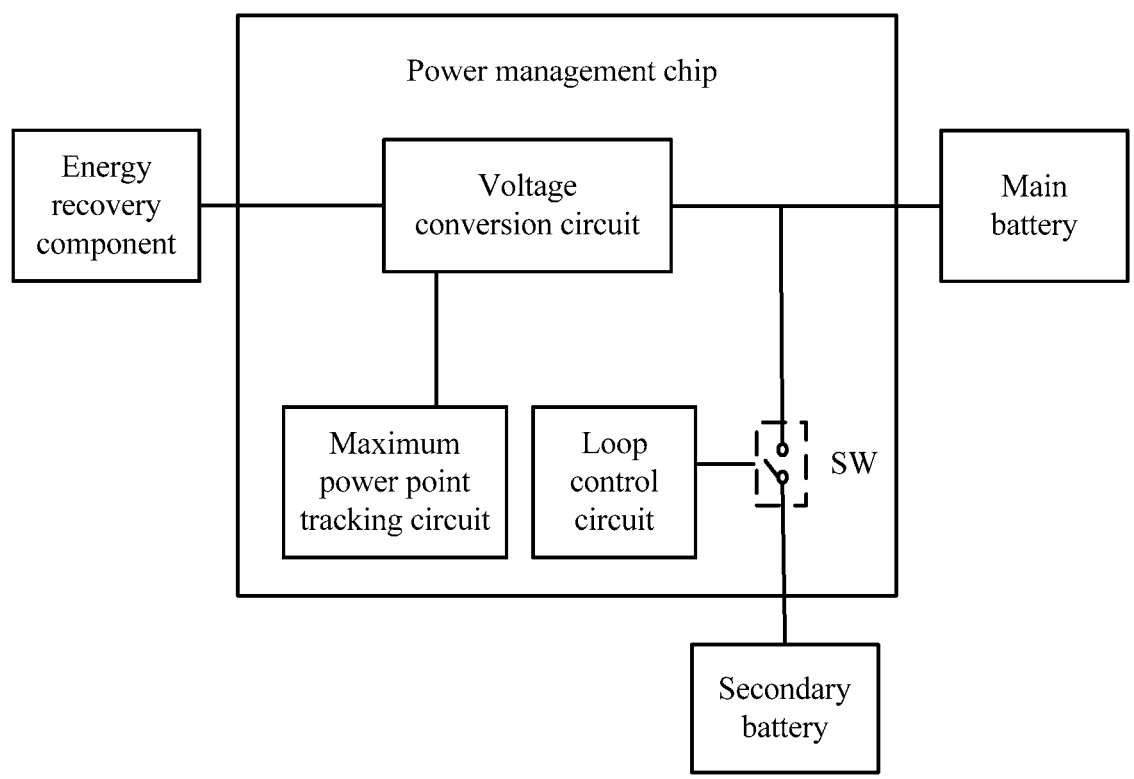
FIG. 1 is an architecture diagram of a power management chip in the prior art.
Figure 2:
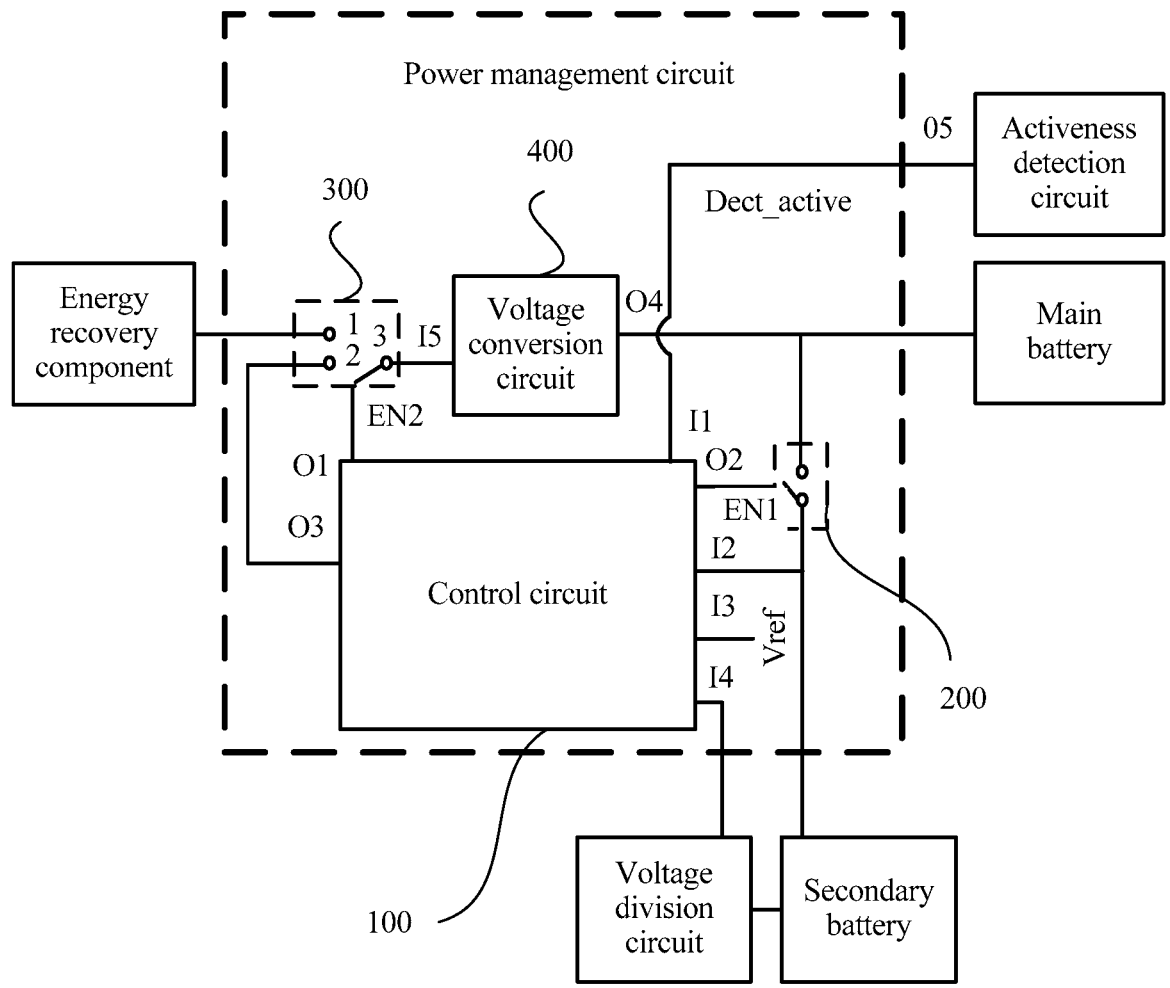
FIG. 2 is a circuit diagram of a power management circuit according to Embodiment 1 of the present invention.

FIG. 2 is a circuit diagram of a power management circuit according to Embodiment 1 of the present invention. As shown in FIG. 2, the power management circuit includes a control circuit (Charger controller) 100, a first switch module 200, a second switch module 300, and a voltage conversion circuit (Boost Regulator) 400.

The control circuit 100 includes a first input end I1, a second input end I2, a third input end I3, a fourth input end I4, a first output end O1, a second output end O2, and a third output end O3. The first input end I1 receives a main battery activeness detection signal Dect_active, the second input end I2 receives a voltage signal of a secondary battery, the third input end I3 receives a preset voltage signal Vref, and the fourth input end I4 receives a voltage division signal of a voltage division circuit. The first output end O1 is connected to an enabling end EN2 of the second switch module 300, the second output end O2 is connected to an enabling end EN1 of the first switch module 200, and the third output end O3 is connected to the second switch module 300.

The first switch module 200 is connected to the voltage conversion circuit 400, the secondary battery, and a main battery (Main Battery).

The second switch module 300 is connected to the voltage conversion circuit 400 and an energy recovery component (Energy Source).

The voltage conversion circuit 400 includes a fifth input end I5 and a fourth output end O4. The fifth input end I5 is connected to the second switch module 300. The fourth output end O4 has two leading wires, one leading wire is connected to the main battery, and the other leading wire is connected to the first switch module 200.

According to the received main battery activeness detection signal Dect_active, the control circuit 100 controls the first switch module 200 to be opened or closed, and controls the enabling end EN2 of the second switch module 300 to input a signal or not to input a signal. When the enabling end EN2 of the second switch module 300 does not input a signal, the second switch module 300 is in a state 13, that is, the second switch module 300 is in the state 13 by default. When the enabling end EN2 of the second switch module 300 inputs a signal, and the input signal is a valid signal, the second switch module 300 is in a state 23. When the input signal is an invalid signal, the second switch module 300 is also in the state 13.

An implementation in which the control circuit 100 controls the enabling end EN2 of the second switch module 300 to input or not to input a signal is described below.

Figure 3:
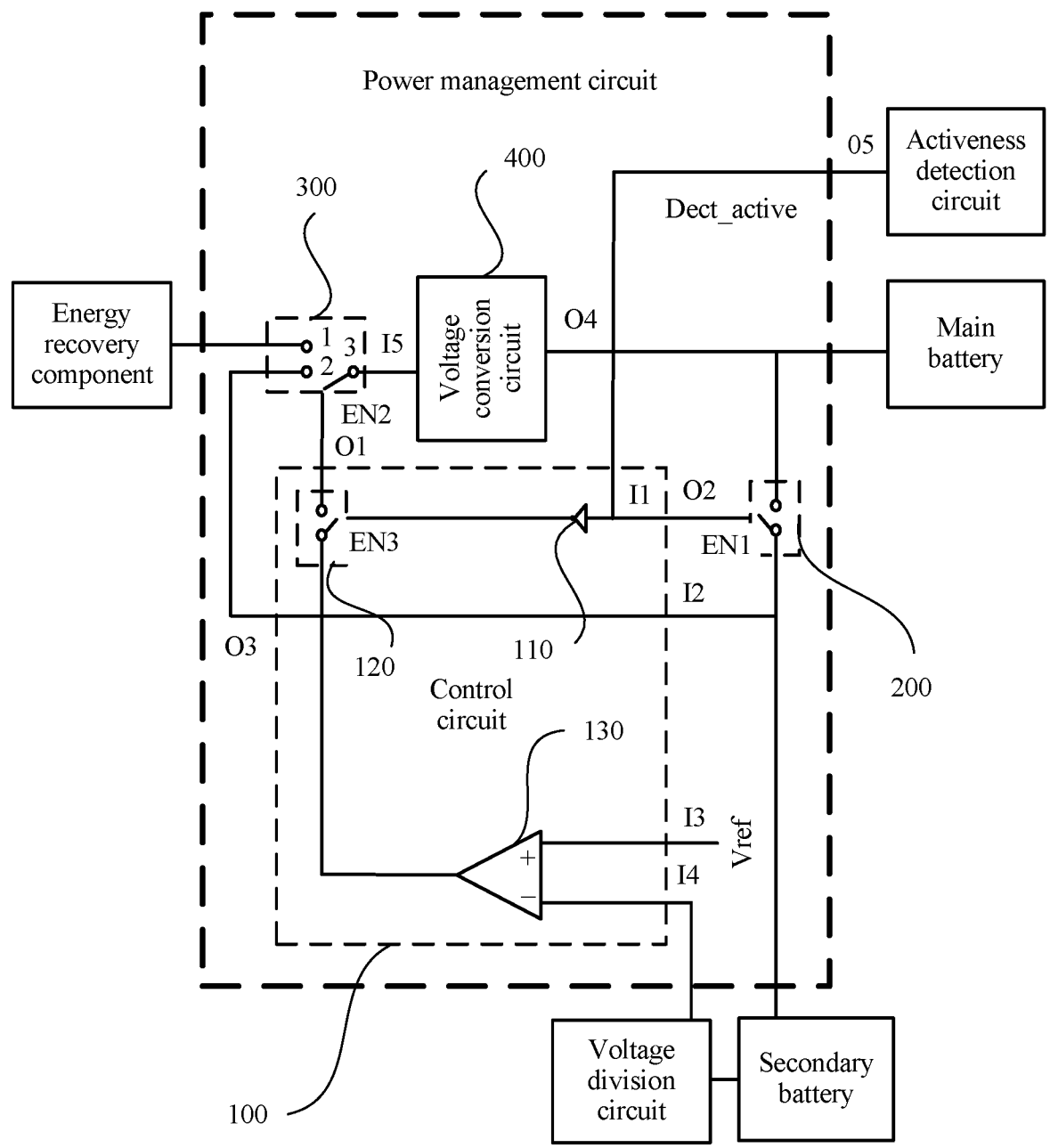
FIG. 3 is a circuit diagram of a power management circuit according to Embodiment 2 of the present invention.

Referring to FIG. 3, FIG. 3 is a structural diagram of a power management circuit according to Embodiment 2 of the present invention. As shown in FIG. 3, a control circuit 100 in the power management circuit further includes an inverter 110, a third switch module 120, and a comparator 130.

Inside the control circuit 100, the inverter 110 is connected to a first input end I1, an enabling end EN3 of the third switch module 120, and a second output end O2, and is configured to control a first switch module 200 and the third switch module 120 to be in opposite states. Specifically, when the first input end I1 of the inverter 110 inputs a valid detection signal Dect_active, for example, inputs a low-level signal, the second output end O2 outputs the low-level signal, an enabling end EN1 of the first switch module 200 receives the low-level signal, the first switch module 200 is in an open state, the low-level signal becomes a high-level signal after being converted by the inverter 110, the enabling end EN3 of the third switch module 120 receives the high-level signal, and the third switch module 120 is in a closed state. When the first input end I1 of the inverter 110 inputs a high-level signal, the second output end O2 outputs the high-level signal, the enabling end EN1 of the first switch module 200 receives the high-level signal, the first switch module 200 is in a closed state, the high-level signal becomes a low-level signal after being converted by the inverter 110, the enabling end EN3 of the third switch module 120 receives the low-level signal, and the third switch module 120 is in an open state.

The third switch module 120 is connected to a first output end O1 and an output end of the comparator 130, and the enabling end EN3 of the third switch module 120 is connected to the inverter 110. The control circuit 100 controls, by using the third switch module 120, an enabling end EN2 of a second switch module 300 to input or not to input a signal.

Specifically, when the inverter 110 controls the third switch module 120 to be in a closed state, a channel between the enabling end EN2 of the second switch module and the output end of the comparator 130 may be connected, so that the enabling end EN2 of the second switch module 300 can input a signal, that is, the control circuit 100 can control the enabling end EN2 of the second switch module 300 to input a signal.

On the contrary, when the inverter 110 controls the third switch module 120 to be in an open state, the channel between the enabling end EN2 of the second switch module and the output end of the comparator 130 is disconnected, so that the enabling end EN2 of the second switch module 300 does not input a signal, that is, the control circuit 100 can control the enabling end EN2 of the second switch module 300 not to input a signal.

Inside the control circuit 100, the comparator 130 is connected to a third input end I3, a fourth input end O4, and the third switch module 120, and is configured to: compare a voltage division signal of a voltage division circuit that is received by the fourth input end I4 with a preset voltage signal Vref received by the third input end I3, and control, according to a comparison result, a signal output by the first output end O1, so that the control circuit 100 can control the enabling end EN2 of the second switch module 300 to input a valid signal or an invalid signal.

An implementation in which the control circuit 100 controls the enabling end EN2 of the second switch module 300 to input or not to input a signal is described above. An implementation in which the control circuit 100 controls the enabling end EN2 of the second switch module 300 to input a valid signal or an invalid signal when a signal is input is described below.

Specifically, when the third switch module 120 is in a closed state, that is, when the control circuit 100 controls the enabling end EN2 of the second switch module 300 to input a signal, and when the comparator 130 learns, by means of comparison, that a divided voltage of the voltage division circuit is higher than the Vref, the comparator 130 controls the first output end O1 to output a low-level signal, the low-level signal is a valid signal, the enabling end EN2 of the second switch module 300 receives the valid signal, and the second switch module 300 is in a state 23. When the comparator 130 learns, by means of comparison, that the divided voltage of the voltage division circuit is not higher than the Vref, the comparator 130 controls the first output end O1 to output a low-level signal, the low-level signal is an invalid signal, the enabling end EN2 of the second switch module 300 receives the invalid signal, the invalid signal cannot play a control function, and the second switch module 300 returns to a default state 13.

It should be noted that the control circuit 100 may control, in another manner, the enabling end EN2 of the second switch module 300 to input a valid signal or an invalid signal when a signal is input. For example, an analog-to-digital converter (Analog-to-digital Converter, ADC) may be combined with software for implementation. Specifically, the ADC is used to sample a voltage of the voltage division circuit, and the software is used to compare the voltage of the voltage division circuit with the preset voltage signal Vref, and to control, according to a comparison result, the enabling end EN2 of the second switch module 300 to input a low-level signal or a high-level signal, so as to control the enabling end EN2 of the second switch module 300 to input a valid signal or an invalid signal.

In addition, the switch module mentioned in Embodiment 1 and Embodiment 2 of the present invention may be implemented by using a switch SW, or may be implemented by using a CMOS circuit, and this is not limited in the present invention.

It should be further noted that in this embodiment of the present invention, an energy recovery component is a component that can convert energy in another form in an environment into electric energy, for example, a component that can convert thermal energy, optical energy, mechanical vibration, and radio wave energy into electric energy. A main battery is disposed on a host. In addition, the host in this specification further includes a micro control unit (Micro Control Unit, MCU), an activeness detection circuit, Bluetooth, and the like, and can support an activeness detection function by using a contact.

Specifically, a main battery activeness detection signal Dect_active is received by the control circuit 100 from the activeness detection circuit by using the first input end I1, the activeness detection circuit includes a fifth output end O5, and the fifth output end O5 is connected to the first input end I1. The activeness detection circuit is configured to detect whether the host is in an active state. When it is detected that the host is in an active state, a valid detection signal Dect_active is output by using the fifth output end O5. When it is detected that the host is in an inactive state, an invalid detection signal Dect_active is output by using the fifth output end O5. In a specific implementation, the valid detection signal Dect_active may be a low-level signal, and the invalid detection signal Dect_active may be a high-level signal.

In FIG. 2, when the first input end I1 of the control circuit 100 receives an invalid detection signal Dect_active, for example, receives a high-level signal, the control circuit 100 controls the second output end O2 to output the high-level signal, that is, the enabling end EN1 of the first switch module 200 receives the high-level signal, and the first switch module 200 is in a closed state. In addition, the control circuit 100 controls the first output end O1 to output a low-level signal, and controls, by using the low-level signal, the enabling end EN2 of the second switch module 300 not to input a signal. As described above, when the enabling end EN2 of the second switch module 300 does not input a signal, the second switch module 300 is in the state 13 by default, that is, a channel between the energy recovery component and the voltage conversion circuit is connected. In this case, a voltage signal output by the energy recovery component reaches the fifth input end I5 of the voltage conversion circuit 400 through the second switch module 300. The voltage conversion circuit 400 converts the voltage signal (for example, converts a low voltage output by the energy recovery component into a target voltage), and outputs the converted voltage signal to the secondary battery by using the fourth output end O4. In this way, the energy recovery component charges the secondary battery.

It should be noted that when the activeness detection circuit detects that the host is inactive, that is, the voltage conversion circuit 400 is disconnected from the main battery, the invalid detection signal Dect_active is output by using the fifth output end O5, that is, the control circuit 100 receives the invalid detection signal Dect_active by using the first input end I1. Therefore, after converting the voltage signal output by the energy recovery component, the voltage conversion circuit 400 directly outputs the voltage signal to the secondary battery by using the fourth output end O4.

When the first input end I1 of the control circuit 100 receives a valid detection signal Dect_active, for example, receives a low-level signal, the control circuit 100 controls the second output end O2 to output the low-level signal, that is, the enabling end EN1 of the first switch module 200 receives the low-level signal, and the first switch module 200 is in an open state. In addition, the control circuit 100 controls the first output end O1 to output a high-level signal, and controls, by using the high-level signal, the enabling end EN2 of the second switch module 300 to input a signal. As described above, when the enabling end EN2 of the second switch module 300 inputs a signal and the input signal is a valid signal, the valid signal controls the second switch module 300 to be in the state 23, that is, a channel between the control circuit and the voltage conversion circuit is connected. In this case, if the secondary battery inputs a voltage signal to the control circuit 100 by using the second input end I2, the control circuit 100 controls the third output end O3 to output the voltage signal. Because the second switch module 300 is in the state 23, the voltage signal reaches the fifth input end I5 of the voltage conversion circuit 400 through the second switch module 300. The voltage conversion circuit 400 converts the voltage signal (for example, converts a low voltage output by the secondary battery into a target voltage), and outputs the converted voltage signal to the main battery by using the fourth output end O4. In this way, the main battery charges the secondary battery.

In the foregoing process, when the enabling end EN2 of the second switch module 300 inputs a signal and the input signal is an invalid signal, because the invalid signal cannot play a control function, the second switch module 300 is in the default state 13, that is, a channel between the energy recovery component and the voltage conversion circuit is connected. In this case, a voltage signal output by the energy recovery component reaches the fifth input end I5 of the voltage conversion circuit 400 through the second switch module 300. The voltage conversion circuit 400 converts the voltage signal (for example, converts a low voltage output by the energy recovery component into a target voltage), and outputs the converted voltage signal to the main battery by using the fourth output end O4. In this way, the energy recovery component charges the main battery.

In this case, after converting the voltage signal output by the energy recovery component, the voltage conversion circuit 400 directly outputs the voltage signal to the main battery by using the fourth output end O4 because when the first switch module 200 is in an open state, the fourth output end O4 of the voltage conversion circuit 400 is connected only to the main battery.

Figure 4:
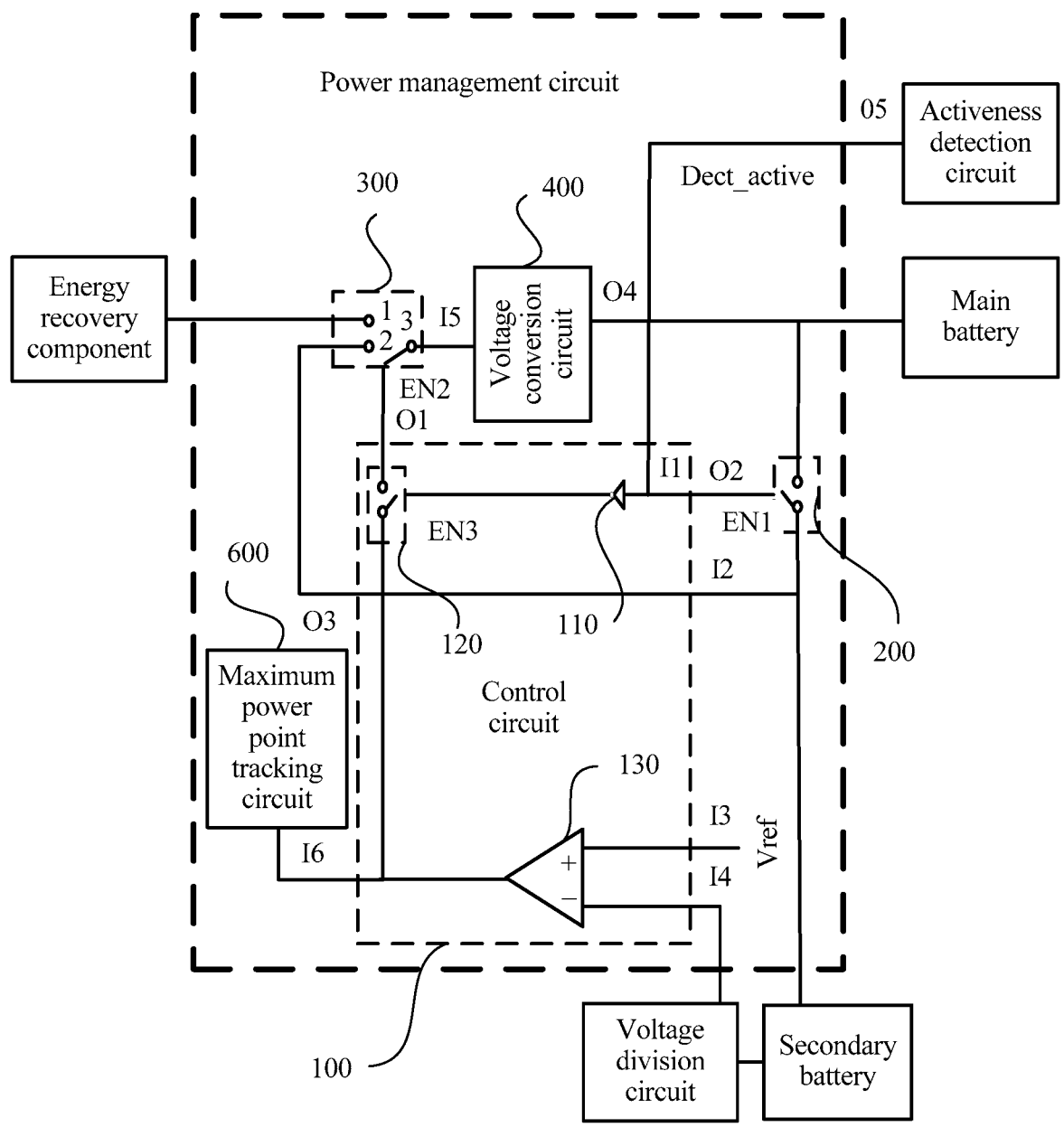
FIG. 4 is a circuit diagram of a power management circuit according to Embodiment 3 of the present invention.

FIG. 4 is a structural diagram of a power management circuit according to Embodiment 3 of the present invention. As shown in FIG. 4, the power management circuit further includes a maximum power point tracking circuit (Maximum Power Point Tracking Controller) 600.

The maximum power point tracking circuit 600 includes a sixth input end I6, and the sixth input end I6 is connected to an output end of a comparator 130. The sixth input end I6 of the maximum power point tracking circuit 600 inputs an enabling signal, and the enabling signal may be a valid signal output by the inverter 110 in FIG. 3 by using the output end when the inverter 110 learns, by means of comparison, that the divided voltage of the voltage division circuit is higher than the Vref. Specifically, when receiving the enabling signal output by the output end of the inverter 110, the maximum power point tracking circuit 600 periodically configures a working voltage of an energy recovery component, so that the energy recovery component works at a maximum power output point. The working voltage is configured by the maximum power point tracking circuit according to an open-circuit voltage of the energy recovery component and a preset algorithm.

Specifically, the maximum power point tracking circuit 600 periodically performs the following steps according to a characteristic of the energy recovery component: first, setting a voltage conversion circuit to a stop state; then sampling the open-circuit voltage of the energy recovery component, and configuring the working voltage of the energy recovery component according to the preset algorithm, so that the energy recovery component works at the maximum power output point; and finally, starting the voltage conversion circuit 400.

In conclusion, the control circuit 100 in the present invention can control a loop of charging currents of dual batteries, such as controlling opening and closing of the first switch module, the second switch module, and the third switch module, and implement an under-voltage protection (Under-Voltage Protection, UVP) function and an overvoltage protection (Overvoltage Protection, OVP) function for dual-battery charging. The control circuit 100 is further configured to perform enabling control on the maximum power point tracking circuit. In this way, when a voltage of the secondary battery is lower than a voltage of the main battery, the main battery can still be charged.

Figure 5:
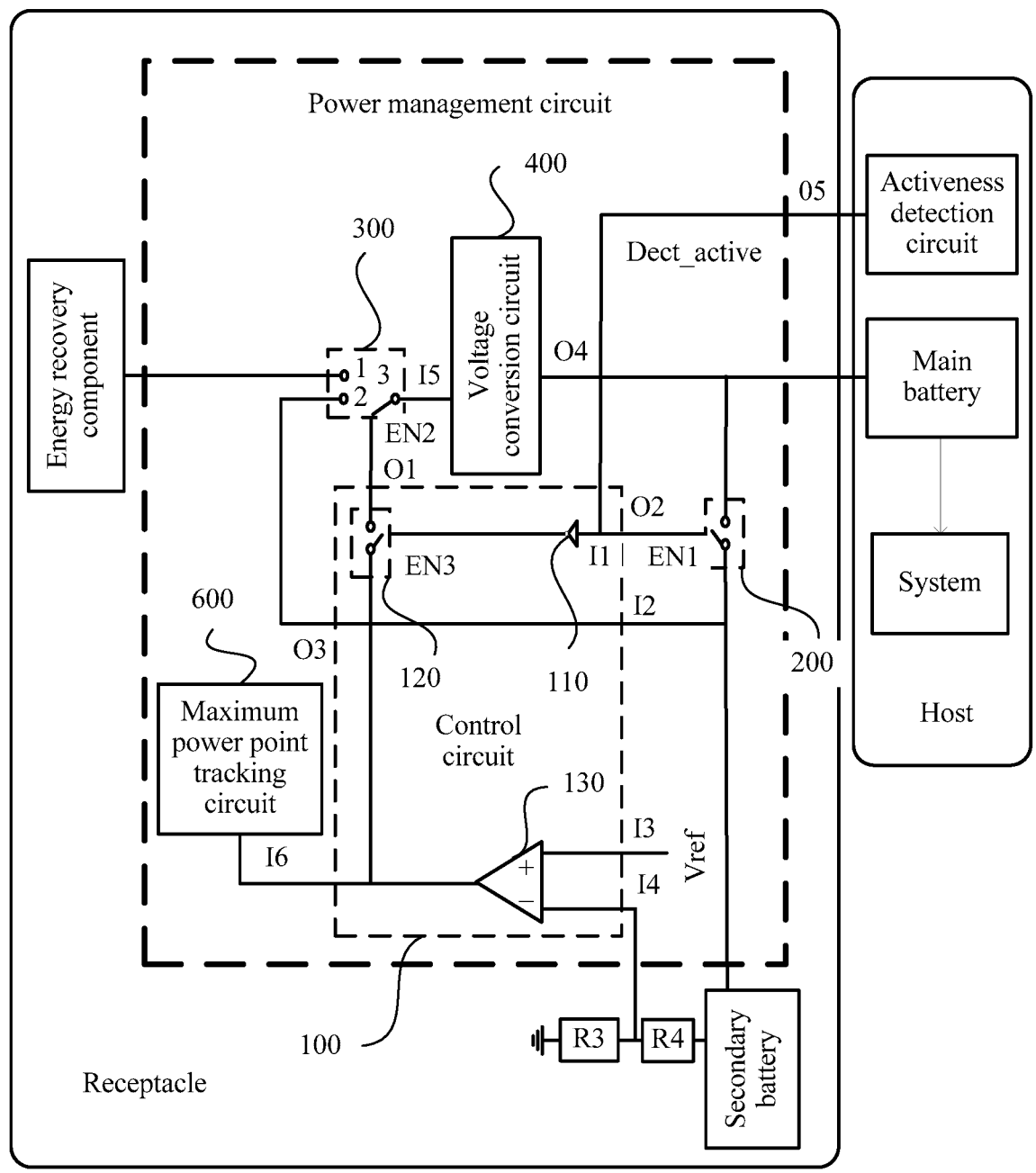
FIG. 5 is a circuit diagram of an intelligent terminal according to the present invention.

FIG. 5 is a circuit diagram of an intelligent terminal according to an embodiment of the present invention. In FIG. 5, the intelligent terminal includes a host and a receptacle (such as a wrist strap) that can be separated from the host. The host includes a main battery and an activeness detection circuit, and the receptacle includes an energy recovery component, a secondary battery, and the power management circuit in the foregoing Embodiment 1, Embodiment 2, or Embodiment 3.

Figure 6:
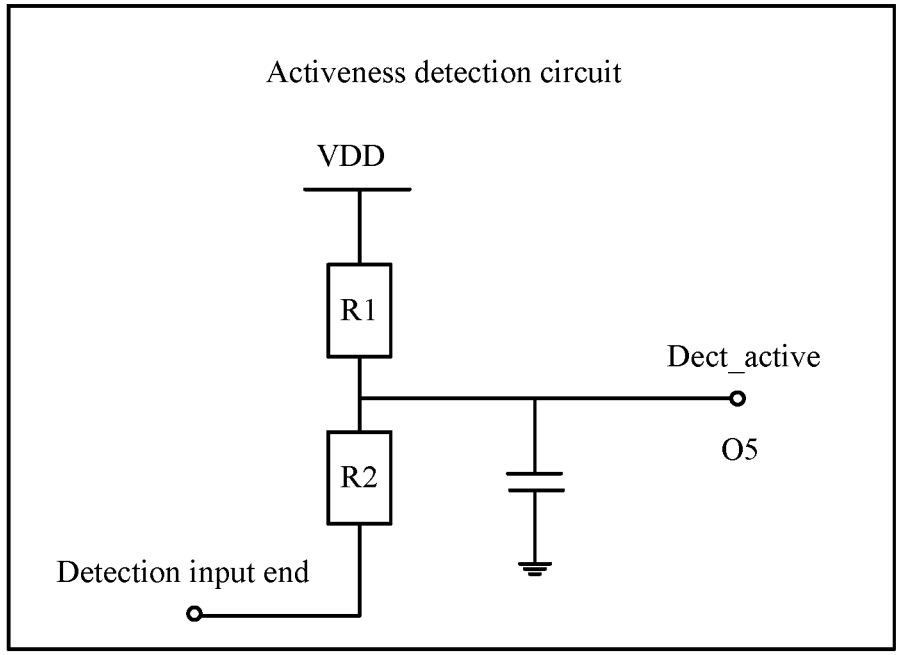
FIG. 6 is a circuit diagram of an activeness detection circuit according to the present invention.

For an implementation of the activeness detection circuit, refer to FIG. 6. In FIG. 6, the activeness detection circuit includes a first resistor R1 and a second resistor R2. Specifically, the first resistor R1 and the second resistor R2 are connected between a power end VDD and a detection input end. There are two leading wires between the first resistor R1 and the second resistor R2, one leading wire is connected to a fifth output end O5, and the other leading wire is grounded by using a capacitor. The capacitor herein has functions of voltage regulation and filtering, that is, the capacitor can ensure that the fifth output end O5 outputs a stable main battery activeness detection signal Dect_active. Specifically, when the host is inactive, the detection input end does not input a signal, and a voltage signal output by the fifth output end O5 is pulled up to the VDD by the first resistor R1, that is, the fifth output end O5 outputs an invalid detection signal. When the host is active, the detection input end is grounded, that is, the detection input end, the first resistor R1, the second resistor R2, and the VDD form a loop, or that is, the first resistor R1 and the second resistor R2 divides a voltage of the VDD, so that the voltage signal output by the fifth output end O5 is not equal to the VDD, that is, the fifth output end O5 outputs a valid detection signal.

Certainly, in actual application, the activeness detection circuit may be implemented by using another circuit, such as a capacitor, a Hall component, or a heart rate sensor, and this is not limited in the present invention. For example, the activeness detection circuit is implemented by using a capacitor. When a person wears the intelligent terminal, capacitance of the capacitor changes. Therefore, whether the host is active can be detected by detecting the capacitance of the capacitor.

Optionally, the receptacle in FIG. 5 may further include a voltage division circuit, and the voltage division circuit includes a first voltage division resistor R3 and a second voltage division resistor R4. The first voltage division resistor R3 and the second voltage division resistor R4 are connected between a grounded end and the secondary battery. There is a leading wire between the first voltage division resistor R3 and the second voltage division resistor R4, and the leading wire is connected to a fourth input end 14. A voltage signal obtained after a voltage of the secondary battery is divided by the first voltage division resistor R3 and the second voltage division resistor R4 is input to a inverter 110 by using the fourth input end 14. The inverter 110 compares a voltage division voltage of the first voltage division resistor R3 with Vref, and controls, according to a comparison result, a signal output by a first output end O1. A method for controlling, according to the comparison result, the signal output by the first output end O1 is described in Embodiment 2 of the present invention, and details are not described herein again.

It should be noted that the foregoing preset voltage signal Vref may be determined according to a formula Vref=V1×(R3/R3+R4). V1 is a threshold voltage corresponding to a preset remaining power threshold A of the secondary battery, and the remaining power threshold A of the secondary battery may be set according to a material of the secondary battery, for example, may be set to 80% or 50%. When the preset remaining power threshold A of the secondary battery is 80%, and an open-circuit voltage of the secondary battery is 10 V, V1 may be 10×80%=8 V. When the preset remaining power threshold A of the secondary battery is 50%, and the open-circuit voltage of the secondary battery is 10 V, V1 may be 10×50%=5 V.

It may be learned from the foregoing formula that, in the present invention, remaining power of the secondary battery is calculated by determining the voltage of the secondary battery. In addition, in the present invention, resistance of the R3 and resistance of the R4 may be adjusted according to the preset voltage signal Vref.

In conclusion, in this embodiment of the present invention, the intelligent terminal compares the voltage of the voltage division circuit and the preset voltage signal Vref, that is, determines a relationship between the remaining power of the secondary battery and the remaining power threshold A. When the remaining power of the secondary battery is higher than the remaining power threshold A, a channel used by the secondary battery to charge the main battery is connected and an enabling signal is output. When the remaining power of the secondary battery is not higher than the remaining power threshold A, the channel used by the secondary battery to charge the main battery is disconnected.

The intelligent terminal provided in this embodiment of the present invention may be a smart band, a smart watch, a smart hat, or the like that uses an energy recovery technology and that has dual batteries, and can implement, by using the voltage division circuit, a function of charging the main battery when the voltage of the secondary battery is lower than the voltage of the main battery. Therefore, charging efficiency of the intelligent terminal is improved.

Figure 7:
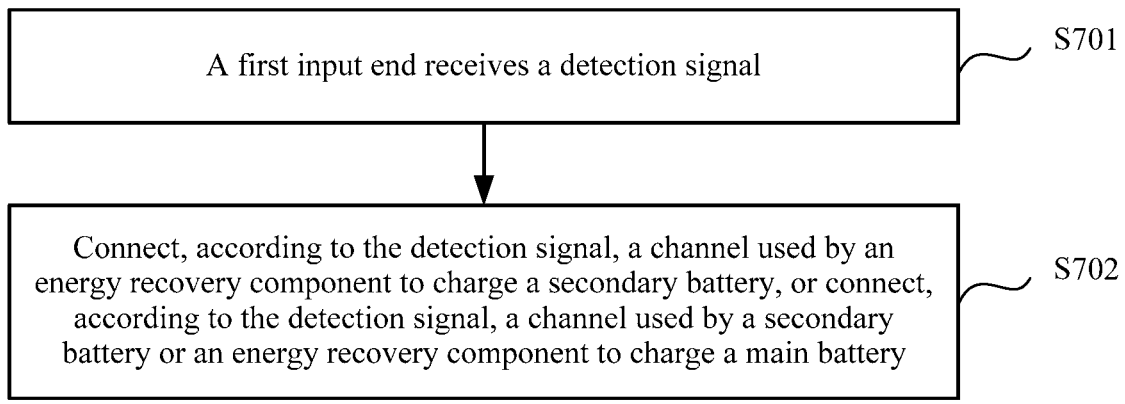
FIG. 7 is a flowchart of a charging method of a power management circuit according to Embodiment 4 of the present invention.

FIG. 7 is a flowchart of a charging method of a power management circuit according to Embodiment 4 of the present invention. The charging method provided in this embodiment of the present invention is based on the power management circuit described in the foregoing embodiments. As shown in FIG. 7, the charging method of the power management circuit in this embodiment of the present invention specifically includes the following steps.

Step 701: A first input end receives a main battery activeness detection signal.

Specifically, a first input end of a control circuit receives a main battery activeness detection signal Dect_active of an activeness detection circuit. The activeness detection circuit is configured to: detect whether a host is in an active state, and output a valid detection signal Dect_active when detecting that the host is in an active state, or output an invalid detection signal Dect_active when detecting that the host is in an inactive state. In a specific implementation, the valid detection signal Dect_active may be a low-level signal, and the invalid detection signal Dect_active may be a high-level signal.

Step 702: Connect, according to the main battery activeness detection signal, a channel used by an energy recovery component to charge a secondary battery, or connect, according to the main battery activeness detection signal, a channel used by an energy recovery component or a secondary battery to charge a main battery.

In this embodiment of the present invention, the energy recovery component is a component that can convert energy in another form in an environment into electric energy, for example, a component that can convert thermal energy, optical energy, mechanical vibration, and radio wave energy into electric energy.

In step 702, when the received main battery activeness detection signal is an invalid detection signal, the channel used by the energy recovery component to charge the secondary battery is connected, and when the received main battery activeness detection signal is a valid detection signal, the channel used by the secondary battery or the energy recovery component to charge the main battery is connected.

According to the charging method provided in this embodiment of the present invention, when the host is in an active state, the main battery can be preferably charged, so as to ensure normal charging of dual batteries.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A power management circuit, wherein the power management circuit comprises a control circuit, a first switch module, a second switch module, and a voltage conversion circuit;

the control circuit comprises a first input end, a first output end, and a second output end, wherein the first input end is configured to receive a main battery activeness detection signal, the first output end is connected to an enabling end of the second switch module, and the second output end is connected to an enabling end of the first switch module;

the first switch module is connected to the voltage conversion circuit, a secondary battery, and a main battery;

the second switch module is connected to the voltage conversion circuit and an energy recovery component; and according to the received main battery activeness detection signal, the control circuit controls the first switch module to be closed or opened, and controls the second switch module to either not receive any-signal, or receive a valid signal or an invalid signal, wherein when the valid signal is received by the second switch module and the first switch module is controlled to be opened, the second switch module is caused to be in a first state where a first channel used by the energy recovery component to charge the secondary battery is connected, and wherein invalid signal is received by the second switch module and the first switch module is controlled to be opened, the second switch module is caused to be in a second state where a second channel used by the secondary battery or the energy recovery component to charge the main battery is connected.

2. The power management circuit according to claim 1, wherein when the main battery activeness detection signal received by the control circuit is an invalid detection signal, the control circuit controls the first switch module to be closed and controls the enabling end of the second switch module not to receive any signal; and when the second switch module is in the first state, the energy recovery component and the voltage conversion circuit is connected, and the voltage conversion circuit converts a voltage signal received from the energy recovery component and outputs the voltage signal to the secondary battery, so that the channel used by the energy recovery component to charge the secondary battery is connected.

3. The power management circuit according to claim 1, wherein
when the main battery activeness detection signal received by the control circuit is a valid detection signal, the control circuit controls the first switch module to be opened and controls the enabling end of the second switch module to input the second signal comprising the valid signal; and when, the second switch module is in the second state, the control circuit and the voltage conversion circuit is connected, and the voltage conversion circuit converts a voltage signal received from the secondary battery and outputs the voltage signal to the main battery, so that the channel used by the secondary battery to charge the main battery is connected.

4. The power management circuit according to claim 1, wherein
when the main battery activeness detection signal received by the control circuit is a valid detection signal, the control circuit controls the first switch module to be opened and controls the enabling end of the second switch module to input the second signal comprising the invalid signal; and
when the second switch module is in the second state, the energy recovery component and the voltage conversion circuit is connected, and the voltage conversion circuit converts a voltage signal received from the energy recovery component and outputs the voltage signal to the main battery, so that the channel used by the energy recovery component to charge the main battery is connected.

5. A charging method, wherein the method comprises:
receiving, by a first input end of a control circuit, a main battery activeness detection signal; and
according to the received main battery activeness detection signal, controlling a first switch module to be closed or opened, and controlling a second switch module to either not receive any signal, or receive a valid signal or an invalid signal, wherein when the valid signal is received by the second switch module and the first switch module is controlled to be opened, the second switch module is caused to be in a first state where a first channel used by the energy recovery component to charge the secondary battery is connected, and wherein invalid signal is received by the second switch module and the first switch module is controlled to be opened, the second switch module is caused to be in a second state where a second channel used by the secondary battery or the energy recovery component to charge the main battery is connected.

* * * * *